United States Patent
Wronski et al.

(10) Patent No.: US 9,494,307 B2
(45) Date of Patent: Nov. 15, 2016

(54) REPOSITIONABLE JUNCTION BOX

(71) Applicant: Cooper Technologies Company, Houston, TX (US)

(72) Inventors: Grzegorz Wronski, Peachtree City, GA (US); Steven Pyshos, Peachtree City, GA (US); Huang Rongxiu, Shanghai (CN)

(73) Assignee: Cooper Technologies Company, Houston, TX (US)

( * ) Notice: Subject to any disclaimer, the term of this patent is extended or adjusted under 35 U.S.C. 154(b) by 5 days.

(21) Appl. No.: 14/740,975

(22) Filed: Jun. 16, 2015

(65) Prior Publication Data

US 2015/0276193 A1   Oct. 1, 2015

Related U.S. Application Data

(63) Continuation of application No. 14/242,381, filed on Apr. 1, 2014, now Pat. No. 9,068,722.

(60) Provisional application No. 61/809,167, filed on Apr. 5, 2013.

(51) Int. Cl.

| | |
|---|---|
| *F21V 23/00* | (2015.01) |
| *F21V 17/02* | (2006.01) |
| *F21S 8/02* | (2006.01) |
| *F21V 21/04* | (2006.01) |
| *H02G 3/20* | (2006.01) |
| *H02G 3/08* | (2006.01) |

(52) U.S. Cl.
CPC ............... *F21V 23/008* (2013.01); *F21S 8/02* (2013.01); *F21S 8/026* (2013.01); *F21V 17/02* (2013.01); *F21V 21/048* (2013.01); *F21V 23/00* (2013.01); *F21V 23/001* (2013.01); *H02G 3/081* (2013.01); *H02G 3/20* (2013.01)

(58) Field of Classification Search
CPC ...... F21V 23/08; F21V 17/02; F21V 21/048; F21V 23/00; F21V 23/001; F21S 8/02; F21S 8/026; H02G 3/081; H02G 3/20
See application file for complete search history.

(56) References Cited

U.S. PATENT DOCUMENTS

| | | | |
|---|---|---|---|
| 3,130,949 A | 4/1964 | Wolff | |
| 3,422,261 A * | 1/1969 | McGinty | F21S 8/02 362/296.01 |
| 4,803,603 A | 2/1989 | Carson | |
| 5,374,812 A | 12/1994 | Chan et al. | |
| 5,452,816 A | 9/1995 | Chan et al. | |

(Continued)

OTHER PUBLICATIONS

Thomas Lighting; Product specification; PS5 5" Recessed Housing; Dec. 26, 2013.

(Continued)

*Primary Examiner* — Mary Ellen Bowman
(74) *Attorney, Agent, or Firm* — King & Spalding LLP

(57) ABSTRACT

A repositionable junction box is disclosed. The repositionable junction box can include a base comprising at least one wall that forms a cavity. The repositionable junction box can also include a coupling portion extending from the at least one wall, where the coupling portion can include at least one first coupling feature disposed at a distal end of the coupling portion, where the at least one first coupling feature is configured to mechanically couple to a first complementary coupling feature of a plurality of first complementary coupling features disposed on a frame.

20 Claims, 10 Drawing Sheets

(56) References Cited

U.S. PATENT DOCUMENTS

| | | | |
|---|---|---|---|
| 5,562,343 A | | 10/1996 | Chan et al. |
| 5,690,423 A | * | 11/1997 | Hentz .................. F21S 8/02 248/302 |
| 5,957,572 A | | 9/1999 | Wedekind et al. |
| 5,957,573 A | * | 9/1999 | Wedekind .............. F21V 21/04 362/147 |
| 7,438,433 B1 | | 10/2008 | Steadman et al. |
| 7,530,705 B2 | | 5/2009 | Czech et al. |
| 7,993,037 B1 | * | 8/2011 | Buse .................. F21S 8/026 362/362 |
| 9,140,435 B2 | | 9/2015 | Yaphe |
| 2007/0131827 A1 | * | 6/2007 | Nevers .................. F21V 21/04 248/201 |
| 2009/0231861 A1 | | 9/2009 | Wedekind |
| 2009/0231862 A1 | * | 9/2009 | Seo .................... F21S 8/02 362/365 |
| 2012/0044703 A1 | | 2/2012 | Wilson |

OTHER PUBLICATIONS

Thomas Lighting; Product specification; PS5RM; 5" Recessed Housing; Jun. 12, 2013.
Thomas Lighting; Product specification; PS1RM; 6" Recessed Housing; Jun. 12, 2013.
Thomas Lighting; Product specification; PS1 6" Recessed Housing; Jun. 12, 2013.
Juno Lighting; Product specification; 6" Deluxe Universal TC Housing; TC2; Feb. 2009.
Juno Lighting; Product specification; 6" Deluxe Universal TC Remodel Housing; TC2R; Aug. 2009.
Juno Lighting; Product specification; 6" Economy Universal IC Remodel Housing; IC22R; Oct. 2009.
Juno Lighting; Product specification; 6" Vertical IC Compact Fluorescent Housing; ICPL618E; Aug. 2012.
Philips Lightolier; Product specification; Lytening LED; Oct. 2012.
Progress Lighting; Product specification; 5" Shallow Housing IC, Non-IC & Air-Tight; Nov. 2001.
Progress Lighting; Product specification; 6" Housing IC Non-IC & Air-Tight; Nov. 2013.
Progress Lighting; Product specification; 6" Housing IC, Non-IC & Air-Tight w/Quick Connects; Nov. 2013.
Progress Lighting; Product specification; 6" Housing IC, Non-IC; Mar. 2006.
Nora Lighting; Product specification; NHRIC-504QAT; 5" IC Air-Tight Line Voltage Remodel Housing; Jan. 2, 2004.
Nora Lighting; Product specification; NHRIC-501QAT; 5" IC Housing; Jan. 2, 2002.
WAC Lighting; Product specification; R-602D-N-ICA; 6" Line Voltage New Construction Housing 120V-IC Rated-Airtight Ready; Apr. 2014.
Prescolite; LiteBox—Light Commercial and Residential Downlights; Catalog; Jan. 2009.
Prescolite; LiteBox 6"; Product specification; New Construction DBXMRI; Mar. 22, 2011.
Lithonia Lighting; Residential Recessed Downlighting Guide; Feb. 2014.

\* cited by examiner

US 9,494,307 B2

REPOSITIONABLE JUNCTION BOX

CROSS-REFERENCE TO RELATED APPLICATIONS

This application is a continuation application of, and claims priority under 35 U.S.C. §120 to, U.S. patent application Ser. No. 14/242,381, titled "Repositionable Junction Box", filed on Apr. 1, 2014, which itself claims priority under 35 U.S.C. §119 to U.S. Provisional Patent Application Ser. No. 61/809,167, titled "Next Generation Luminaire" and filed on Apr. 5, 2013. The entire contents of both of the above-referenced applications are hereby incorporated herein by reference.

TECHNICAL FIELD

Embodiments described herein relate generally to junction boxes, and more particularly to systems, methods, and devices for repositionable junction boxes for luminaires.

BACKGROUND

Recessed light fixtures are used in many residential, commercial, and industrial applications. Generally, the space in which to install a recessed light fixture is limited, and so more the time can be required to install a recessed light fixture when parts of the light fixture (e.g., the luminaire, the luminaire housing) are cumbersome to install.

SUMMARY

In general, in one aspect, the disclosure relates to a repositionable junction box. The repositionable junction box can include a base having at least one wall that forms a cavity. The repositionable junction box can also include a coupling portion extending from the at least one wall, where the coupling portion includes at least one first coupling feature disposed at a distal end of the coupling portion, where the at least one first coupling feature is configured to mechanically couple to a first complementary coupling feature of a number of first complementary coupling features disposed on a frame.

In another aspect, the disclosure can generally relate to a luminaire. The luminaire can include a repositionable junction box and a frame. The repositionable junction box of the luminaire can include a base having at least one wall that forms a cavity. The repositionable junction box of the luminaire can also include a coupling portion extending from the at least one wall, where the coupling portion includes at least one first coupling feature disposed at a distal end of the coupling portion. The frame of the luminaire can include a number of first complementary coupling features, where each of the first complementary coupling features is disposed at a different position on the frame. The repositionable junction box can be disposed in a first position on the frame when the at least one first coupling feature of the repositionable junction box is mechanically coupled to a first complementary coupling feature of the first complementary coupling features.

These and other aspects, objects, features, and embodiments will be apparent from the following description and the appended claims.

BRIEF DESCRIPTION OF THE DRAWINGS

The drawings illustrate only example embodiments of repositionable junction boxes and are therefore not to be considered limiting of its scope, as repositionable junction boxes may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
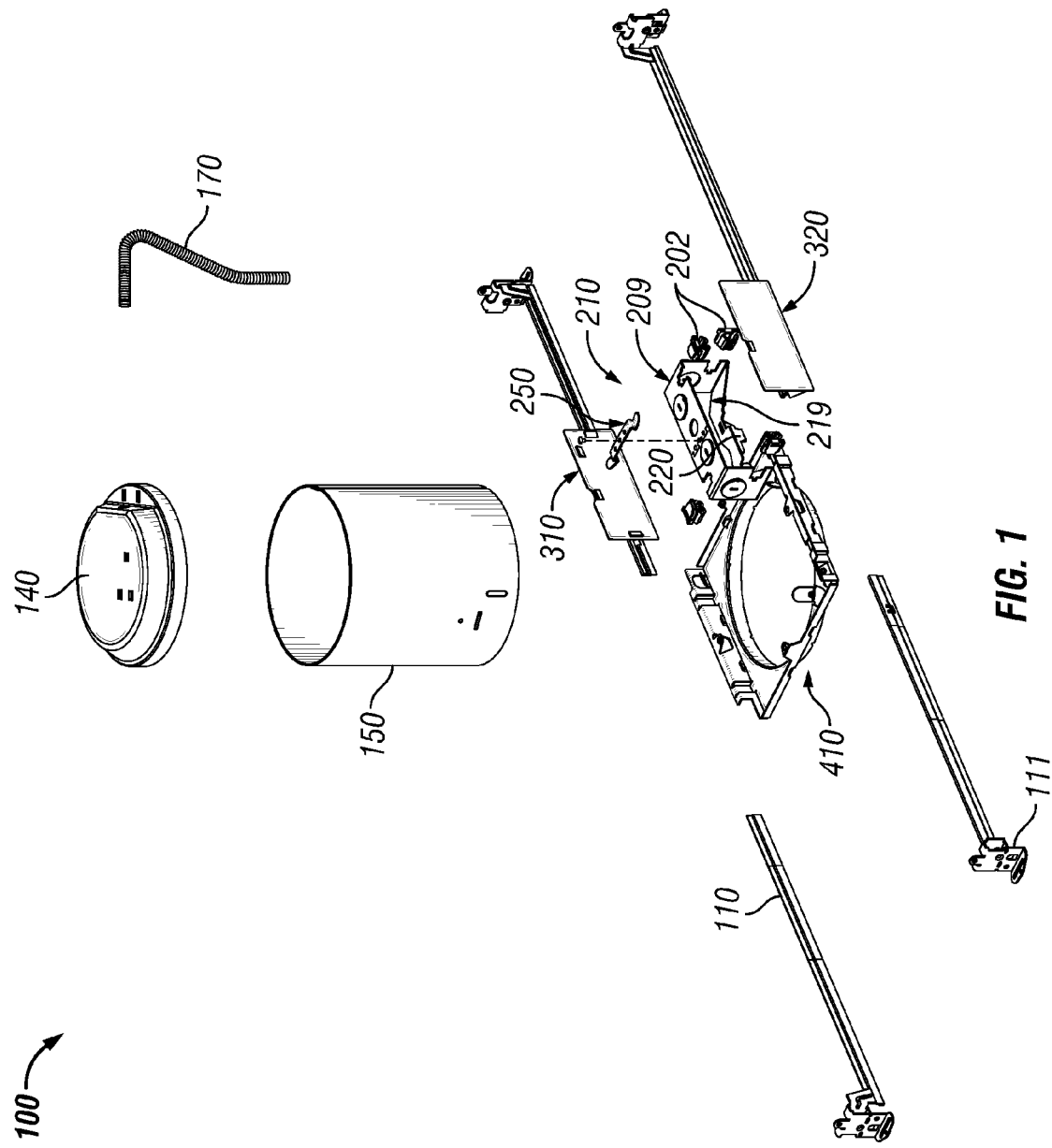
FIG. 1 shows an exploded view of an example luminaire in accordance with certain example embodiments.

The example embodiments discussed herein are directed to systems, apparatuses, and methods of repositionable junction boxes. While the Figures shown and described herein are directed to repositionable junction boxes in luminaires, example repositionable junction boxes can also be used in other applications aside from luminaires, including but not limited to motor control centers, relay cabinets, and enclosures. Thus, the examples of repositionable junction boxes described herein are not limited to luminaires.

With respect to luminaires, while the example embodiments described herein are directed to recessed luminaires, example embodiments (or portions thereof) can also be used for non-recessed luminaires. Example luminaires can be used with one or more of a number of different types of lighting systems, including but not limited to light-emitting diode (LED) lighting systems, fluorescent lighting systems, organic LED lighting systems, incandescent lighting systems, and halogen lighting systems. Therefore, example embodiments described herein should not be considered limited to any particular type of lighting system.

Any example junction box, or portions (e.g., features) thereof, described herein can be made from a single piece (as from a mold). When an example junction box portion thereof is made from a single piece, the single piece can be cut out, bent, stamped, and/or otherwise shaped to create certain features, elements, or other portions of a component. For example, as discussed below, at least a portion of the junction box can be made from a single sheet where various portions are cut out, bent, shaped, and otherwise manipulated to form an example repositionable junction box.

Alternatively, an example junction box (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein can be made of one or more of a number of suitable materials, including but not limited to metal, rubber, and plastic.

A coupling feature (including a complementary coupling feature) as described herein can allow one or more components and/or portions of an example repositionable junction box to become mechanically coupled, directly or indirectly, to a portion (e.g., a frame) of a luminaire and/or to another portion of the repositionable junction box. A coupling feature can include, but is not limited to, a portion of a hinge, an aperture (as shown), a slot, a spring clip, a tab, a detent, and a mating thread. An example repositionable junction box can be coupled to a frame, a housing, and/or another component of a luminaire by the direct use of one or more coupling features.

In addition, or in the alternative, an example repositionable junction box can be coupled to a frame, a housing, and/or another component of a luminaire using one or more independent devices that interact with one or more coupling features disposed on the example repositionable junction box, frame, and/or other component of a luminaire. Examples of such devices can include, but are not limited to, a pin, a hinge, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

As described herein, a user can be any person that interacts with an example repositionable junction box or a portion thereof. Examples of a user may include, but are not limited to, an engineer, an electrician, a maintenance technician, a mechanic, an operator, a consultant, a contractor, a homeowner, and a manufacturer's representative.

The components of example repositionable junction boxes described herein can be physically placed in outdoor environments. In addition, or in the alternative, example repositionable junction boxes can be subject to extreme heat, extreme cold, moisture, humidity, high winds, dust, and other conditions that can cause wear on the repositionable junction boxes or components thereof. In certain example embodiments, the components of repositionable junction boxes, as well as any coupling (e.g., mechanical, electrical) between such components, are made of materials that are designed to maintain a long-term useful life and to perform when required without mechanical failure.

Example embodiments of repositionable junction boxes will be described more fully hereinafter with reference to the accompanying drawings, in which example embodiments of repositionable junction boxes are shown. Repositionable junction boxes may, however, be embodied in many different forms and should not be construed as limited to the example embodiments set forth herein. Rather, these example embodiments are provided so that this disclosure will be thorough and complete, and will fully convey the scope of repositionable junction boxes to those of ordinary skill in the art. Like, but not necessarily the same, elements (also sometimes called components) in the various figures are denoted by like reference numerals for consistency. Terms such as "first," "second," "top," "base," "open," and "closed" are used merely to distinguish one component (or part of a component or state of a component) from another. Such terms are not meant to denote a preference or a particular orientation.

FIG. 1 shows an exploded view of an example luminaire 100 in accordance with certain example embodiments. In one or more embodiments, one or more of the components shown in FIG. 1 may be omitted, added, repeated, and/or substituted. Accordingly, embodiments of luminaires with repositionable junction boxes should not be considered limited to the specific arrangements of components shown in FIG. 1.

Referring to FIG. 1, the luminaire 100 can include a housing (which can include, for example, a housing top 140 (sometimes called a can top 140), a housing 150 (sometimes called a can 150)), flexible conduit 170, a repositionable junction box 210, a frame 410, an optional hanger bar 110, and an optional hanger bar fastener 111. An optional hanger bar fastener 111 can be mechanically coupled to each end of a hanger bar 110 and can be mechanically coupled to a surface (e.g., a wall, a piece of wood, a metal frame, a concrete pillar) that is used to support the luminaire 100.

The housing 150 can have any shape and/or size appropriate for mechanically coupling to the frame 410. The housing 150 can be used to enclose one or more of a number of components of the luminaire 100. Such components can include, but are not limited to, a power source (e.g., a driver, a ballast), one or more light sources, a fan, a reflector, a decorative trim, and a lens. The housing 150 can have a housing top 140, disposed at the top and/or at some other location on the housing 150, to provide access within the housing 150.

In certain example embodiments, the flexible conduit 170 is coupled to both the junction box 210 and a portion of the housing 150. For example, in this case, the flexible conduit 170 is mechanically coupled to the housing top 140 of the housing 150. The flexible conduit 170 can be any component that is capable of containing (hosting) one or more electrical wires. In such a case, the flexible conduit 170 can protect the one or more electrical wires disposed therein from elements (e.g., dirt, moisture) and/or physical harm (e.g., pinching).

Such electrical wires can be used to provide power and/or control between the repositionable junction box 210 and the housing 150. Thus, at least part of the electrical wire is disposed in the repositionable junction box 210, part is disposed in the flexible conduit 170, and part is disposed in the housing 150. As the name implies, the flexible conduit 170 is bendable and movable so that, as the repositionable junction box 210 is repositioned to different positions on the frame 410, the flexible conduit 170 can allow for this repositioning while remaining fixedly coupled to both the repositionable junction box 210 and the housing 150.

The frame 410 can be mechanically coupled to hanger bars 110 on one side of each of the frame 410 so that the hanger bars 110 extend to the left and right of the frame 410 at both the top and bottom ends of the frame 410. In addition, or in the alternative, the frame 410 can be directly coupled to a mounting surface to support the luminaire 100. The frame 410 can have any shape and/or size suitable for the housing 150. In certain example embodiments, one or more portions (e.g., sides) of the frame 410 can include one or more complementary coupling features (described below) that receive and/or otherwise couple to one or more coupling features 220 (also described below) of the repositionable junction box 210.

In certain example embodiments, the repositionable junction box 210 includes one or more of a number of components. For example, the repositionable junction box 210 can include a base 209, a cover 310, a cover 320, a coupling portion 220, one or more wire traps 202, and a fastening mechanism 250. The base 209 can include at least one wall that forms a cavity 219. Details about each of these and other components of the repositionable junction box 210 are described below with respect to FIGS. 2A-2E.

Figure 2A:
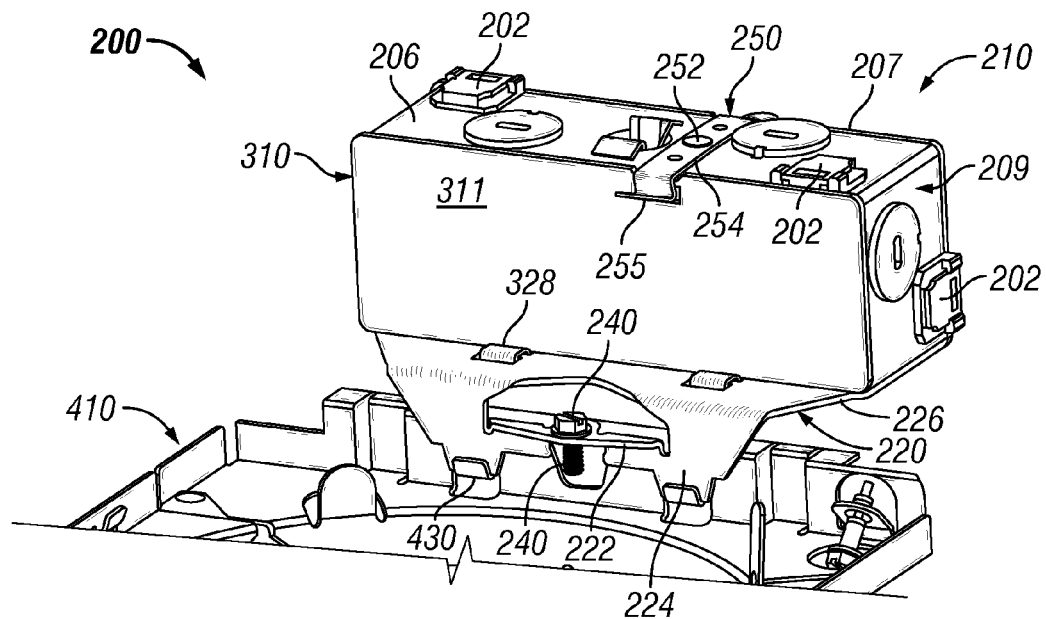
FIGS. 2A-2C show various views of a portion of a luminaire that includes an example repositionable junction box in accordance with certain example embodiments.
Figure 2B:
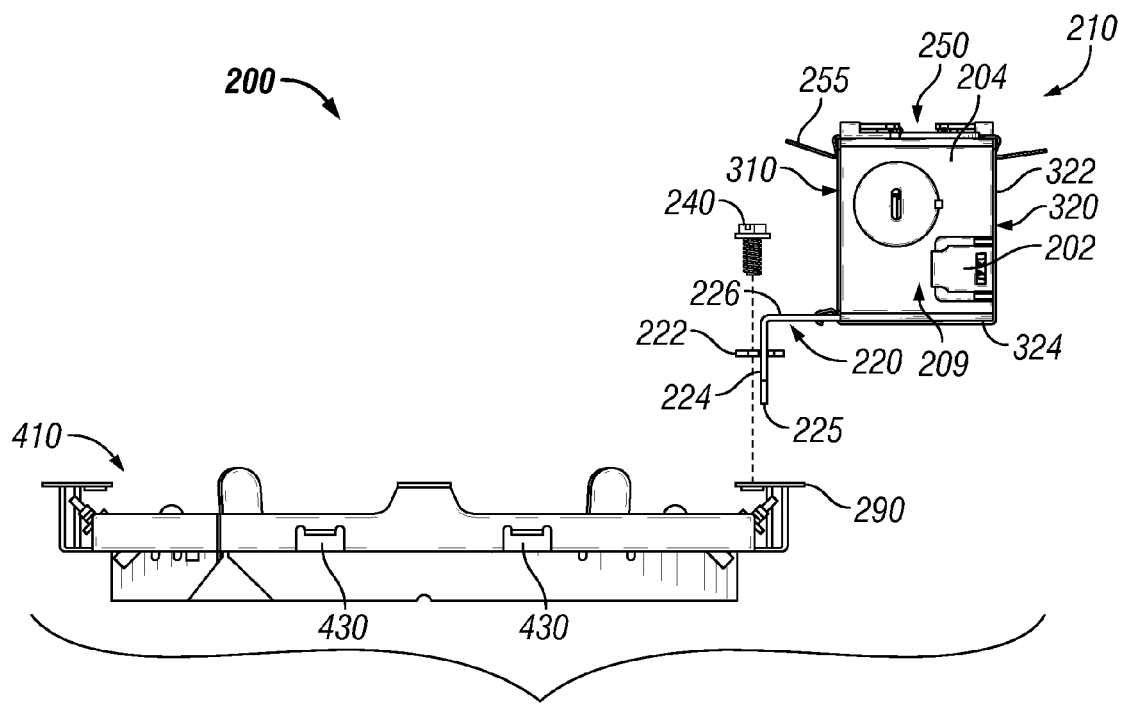
Figure 2C:
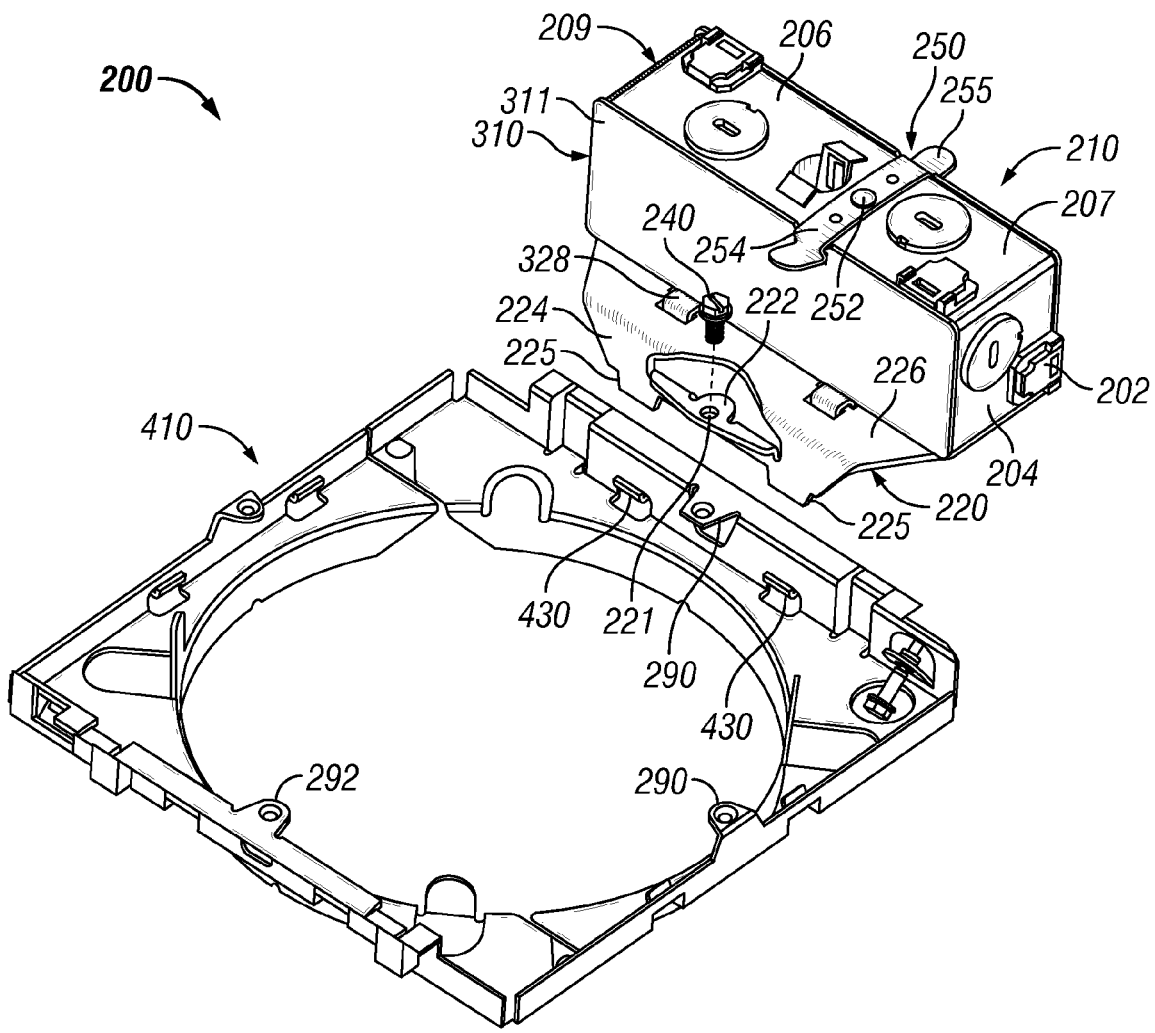
Figure 2D:
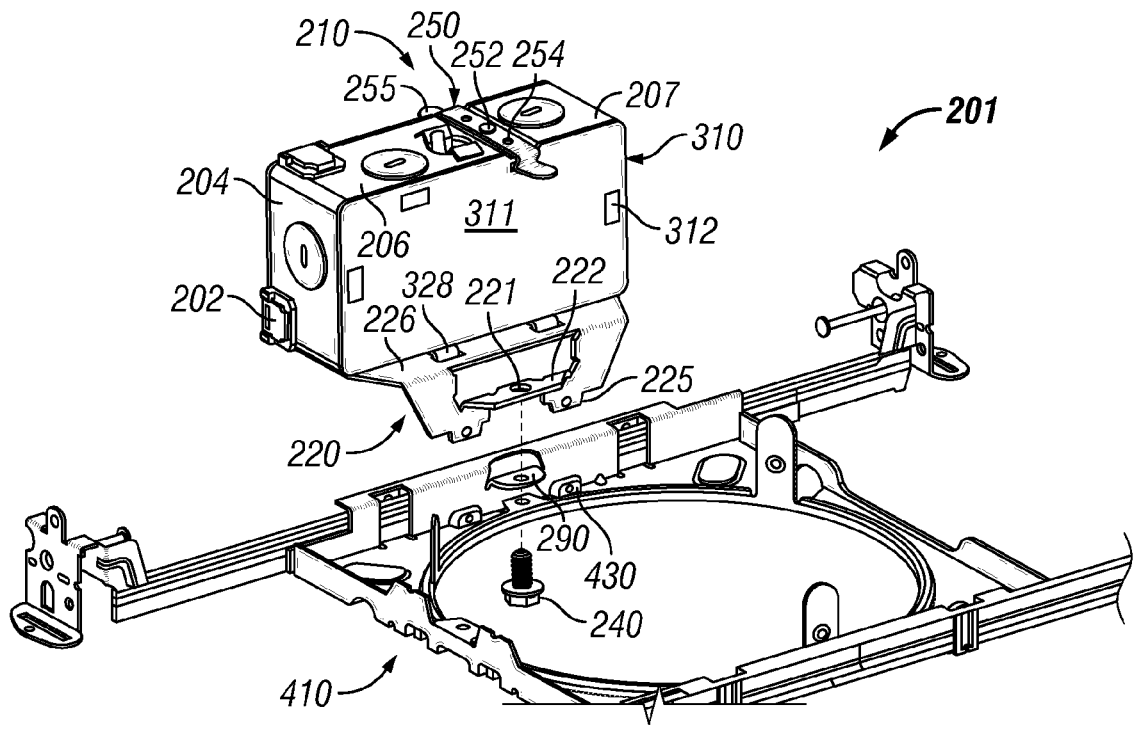
FIGS. 2D and 2E show various views of a portion of a luminaire that includes an example repositionable junction box in accordance with certain example embodiments.
Figure 2E:
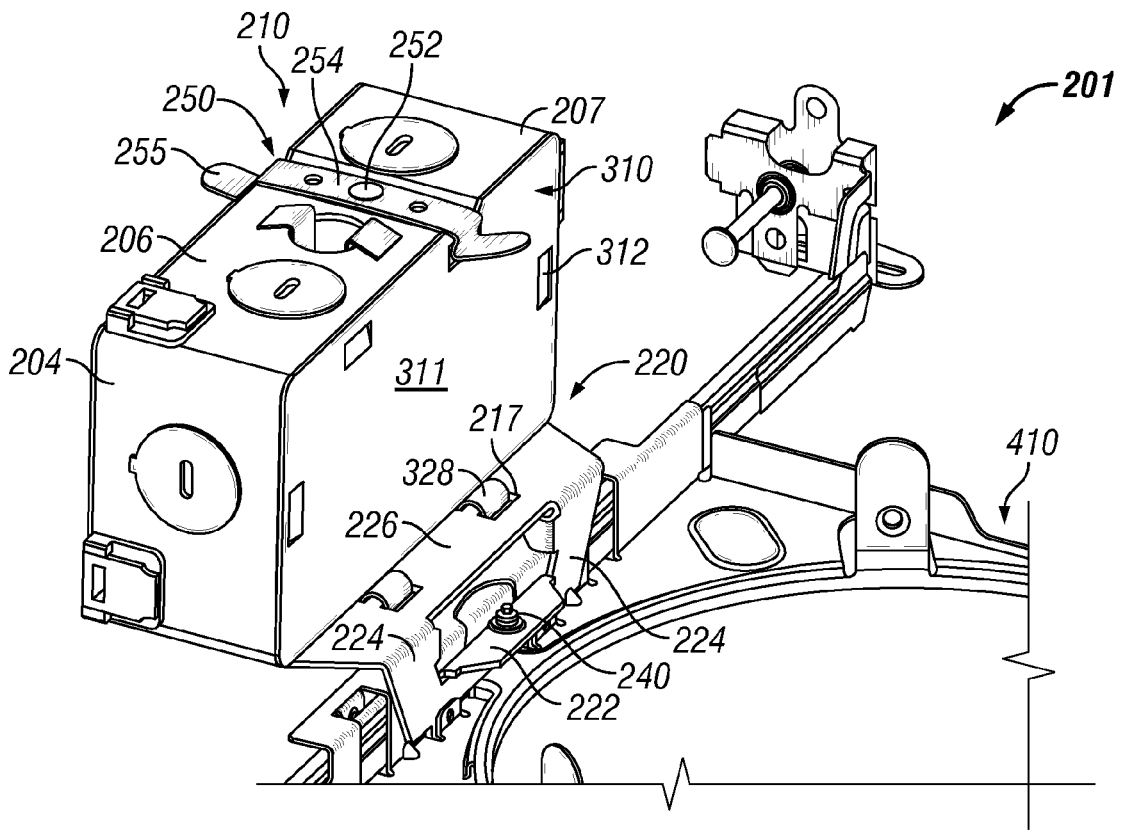

FIGS. 2A-2C show various views of a portion of a luminaire 200 that includes an example repositionable junction box 210 in accordance with certain example embodiments. FIGS. 2D and 2E show various views of a portion of a luminaire 201 that includes an example repositionable junction box 210 in accordance with certain example embodiments. In one or more example embodiments, one or more of the components shown in FIGS. 2A-2E may be omitted, repeated, and/or substituted. Accordingly, example embodiments of luminaires (or portions thereof, such as repositionable junction boxes) should not be considered limited to the specific arrangements of components shown in FIGS. 2A-2E.

Referring to FIGS. 1-2E, the junction box 210 can include a base 209, a cover 310, a cover 320, and a fastening mechanism 250. In certain example embodiments, the fastening mechanism 250 is mechanically coupled (e.g., fixedly, removably) to the base 209 using a fastening device 252 (e.g., a rivet, a screw) and is removably coupled to the flat cover 310 and the shaped cover 320 using a coupling feature 255 (e.g., a spring clip) on either side of a body 254 of the fastening mechanism 250. A number of wire traps 202 can be disposed in various portions (e.g., wall 206, wall 207, wall 204) of the base 209. The components of the junction box 210 not described in more detail here are described in detail below with respect to FIGS. 4-8.

As shown in FIGS. 2A-2E, the base 209 can include at least one wall (e.g., wall 204, wall 206, wall 207) that forms a cavity 219. One or more walls can make up a side of the base 209. For example, wall 206 and wall 207 can make up the top side of the base 209. In certain example embodiments, the base 209 includes, or is coupled to, one or more features that allow the base 209 to mechanically couple one or more portions of the frame 410 and/or some other component (e.g., the housing 150) of the luminaire. The repositionable junction box 210 can also include a coupling portion 220 that extends from the base and includes a bottom 226, a distal extension 224, and one or more coupling features 225 at the distal end of the distal extension 224.

In this case, the bottom 226 of the coupling portion 220 is part of the bottom side of the base 209 and extends laterally beyond where the cover 310 abuts the bottom 226 of the coupling portion 220. Further, the distal extension 224 of the coupling portion 220 can extend downward (e.g., at a right angle) from the bottom 226. In addition, the coupling features 225 extend further downward from the distal extension 224 of the coupling portion 220.

In addition, or in the alternative, the coupling portion 220 can include a coupling platform 222 that includes a coupling feature 221. For example, the coupling portion 220 can be a type of shelf or extension that extends approximately perpendicularly from the distal extension 224 and/or parallel to the bottom 226 of the coupling portion 220. The positioning of the coupling portion 220 can be such that the coupling portion 220 mechanically couples with one portion of the frame 410 while the coupling features 225 couple to a different portion of the frame 410. The coupling portion 220 can include one or more of a number of coupling features 221. For example, as shown in FIGS. 2A-2E, the coupling portion 220 can include a coupling feature 221 in the form of an aperture through which a fastening device 240 (e.g., a bolt, a nut, a clip) can be disposed.

Figure 4:
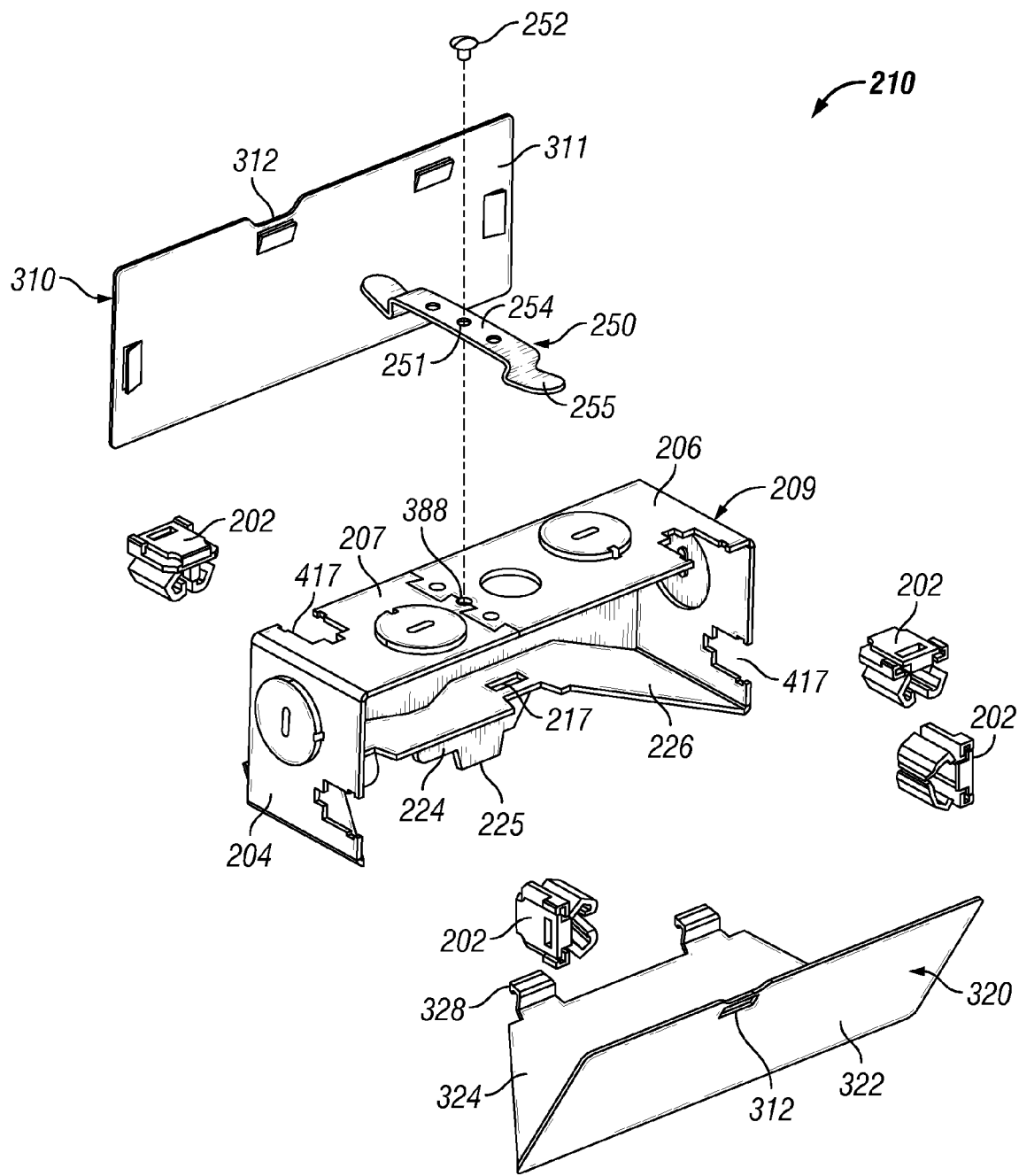
FIG. 4 shows an exploded view of the example repositionable junction box of FIG. 2 in accordance with certain example embodiments.

The fastening mechanism 250 of the repositionable junction box 210 can have a body 254 and a coupling feature 255 (e.g., a spring clip) on either side of the body 254. The body 254 can have one or more of a number of coupling features 251 (e.g., apertures, tabs) disposed along its length. Such coupling features 251 can be used to mechanically couple the body 254 (and, thus, the coupling mechanism 250) to the base 209. In such a case, the base 209 can include one or more of a number of complementary coupling features 388 (e.g., apertures, slots, as shown in FIG. 4 below) to receive the coupling features 251 of the fastening mechanism 250. In certain example embodiments, as shown in FIG. 4, a coupling device 252 (e.g., a rivet, a screw) can be used to mechanically couple the fastening mechanism 250 to the base 209 using the coupling features 251 and the coupling features 388. The coupling features 255 of the fastening mechanism 250 can be used, at least in part, to mechanically couple the cover 310 and/or the cover 320 to the base 209.

In certain example embodiments, the repositionable junction box 210 also includes the cover 310 and the cover 320. The cover 320 can have any shape that allows the cover 320, when engaged with the fastening mechanism 250 and coupled to the base 209, to cover up one open side (formed by the walls) of the repositionable junction box 210 and, in some example embodiments, at least a portion of the bottom of the repositionable junction box 210 so that little or no gap exists between the cover 320 and the bottom of the base 209.

The cover 320 can have one or more of a number of features and/or components. For example, as shown in FIG. 4 below, the cover 320 can include a side wall 322, a bottom wall 324, and one or more coupling features 328. In such a case, the side wall 322 can be used to cover an elongated side of the junction box 210 left open by the walls of the base 209, while the bottom wall 324 can be used to cover the portion of the bottom of the repositionable junction box 210 that is left open by the wall 226 of the base 209.

In certain example embodiments, the coupling features 328 can be used to allow the cover 320 to move while still being mechanically coupled to the base 209 of the repositionable junction box 210. For example, as shown in FIG. 4 below, the coupling features 328 can be tabs that have a hooked end. In such a case, the coupling features 328 can fit through coupling features 217 in the wall 226 of the base 209 when the coupling features 328 are inserted into the complementary coupling features 217 at a certain angle. For example, the coupling features 328 may only fit into the coupling features 217 when the side wall 322 of the cover 320 is substantially parallel with the bottom wall 226 of the base 209.

Once the coupling features 328 are inserted into the coupling features 217, as the cover 320 moves (e.g., rotates) toward a closed position (e.g., as the side wall 322 moves toward the elongated open side of the base 209), the coupling features 328 remain movably (e.g., rotatably) coupled to the coupling features 217. When the cover 320 is moved into the closed position relative to the base 209, the coupling features 255 of the fastening mechanism 250 can be used to mechanically couple the side wall 322 of the cover 320 to the base 209.

The cover 310 can be substantially flat and have one or more coupling features 312 disposed thereon. An example of a coupling feature 312 of the cover 310 can be a recessed portion that allows a user to secure a side wall 311 of the cover 310 using, for example, the fastening mechanism 250. The coupling feature 312 and/or other coupling features of the cover 310 can allow the user to move, remove, and/or replace the cover 310 when the fastening mechanism 250 is not engaged with the cover 310. The cover 310 can be positioned against an elongated open end of the base 209 that is opposite of where the side wall 322 of the cover 320 is located when the cover 320 is in the closed position relative to the base 209.

When the cover 310 and the cover 320 are both in a closed position relative to the base 209, the cavity 219 is not accessible to a user. In other words, when the cover 310 and the cover 320 are both in a closed position relative to the base 209, the repositionable junction box 210 is completely enclosed. When the cover 310 and/or the cover 320 are not in a closed position (in an open position) relative to the base 209, the cavity 219 is (or can be, with the movement of the cover 310 and/or the cover 320) accessible.

If there are no coupling features along the bottom side of the cover 310, the cover 310 can abut against the top surface of the bottom wall 226 of the base 209 when the cover 310 covers the elongated open side of the base 209 (i.e., when the cover 310 is in the closed position relative to the base 209). In certain example embodiments, the cover 310 is positioned proximate to the coupling features 217 between the coupling features 217 and the side walls 204 of the base 209. In such a case, when the cover 310 is in the closed position relative to the base 209, and when the coupling features 328 of the cover 320 remain movably coupled to the coupling features 217 of the base 209, then the cover 310 can be used to prevent the coupling features 328 from becoming decoupled from the coupling features 217 when the cover 320 is moved from the closed position to an open position. Such a configuration can be called a hinged and captive configuration.

Thus, in certain example embodiments, one elongated side of the repositionable junction box 210 (i.e., the side furthest away from the can 150 when the repositionable junction box 210 is coupled to the frame 410) can be accessed by releasing the coupling feature 255 of the fastening mechanism 250 to allow the cover 320 to rotate away from the base 209 and expose the cavity 219 of the repositionable junction box 210. At the same time, when the cover 310 abuts against the other elongated side of the repositionable junction box 210 (i.e., the side closest to the can 150 when the repositionable junction box 210 is coupled to the frame 410), the bottom of the cover 310 maintains the movable coupling between the coupling features 328 of the cover 320 and the coupling features 217 of the base 209. In some cases, the coupling features 328 of the cover 320, when moveably coupled with the coupling features 217 of the coupling portion 220, can help to secure the cover 310 (or, at least, the bottom side of the cover 310) against the base 209.

The principal difference between the example embodiment shown in FIGS. 2A-2C and the example embodiment shown in FIGS. 2D and 2E is the manner in which the fastening device 240 is used to couple the repositionable junction box 210 to the frame 410. Specifically, in FIGS. 2A-2C, the fastening device 240 is inserted downward through the coupling feature 221 of the repositionable junction box 210 and the coupling feature 290 (or, more specifically, the aperture 292 in the coupling feature 290) of the frame 410. By contrast, in FIGS. 2D and 2E, the fastening device 240 is inserted upward through the coupling feature 221 of the repositionable junction box 210 and the coupling feature 290 of the frame 410.

Referring to FIGS. 1A-2E, as discussed above, one or more portions (e.g., sides) of the frame 410 can include one or more complementary coupling features that receive and/or otherwise couple to one or more coupling features (described below) of the junction box 210. For example, each of the four sides of the frame 410 can include a coupling feature 290 in the form of a mating shelf. In such a case, the coupling feature 290 can be set at some angle (e.g., substantially perpendicular to the coupling feature 220 of the repositionable junction box 210) when the repositionable junction box 210 is mechanically coupled to the frame 410. Each coupling feature 290 can include one or more of a number of fastening features 291. For example, as shown in FIGS. 2A-2E, the coupling feature 290 can include a fastening feature 291 in the form of an aperture through which a fastening device 240 (e.g., a bolt, a nut, a clip) can be disposed. In such a case, the fastening device 240 can traverse at least part of the fastening feature 291 of the coupling feature 290 and the fastening feature 221 of the repositionable junction box 210.

As another example, each of the four sides of the frame 410 can include one or more coupling features 430 in the form of receiving tabs. The coupling features 430 can be bent inward to form vertical and/or horizontal boundaries for the coupling features 225 of the repositionable junction box 210. In certain example embodiments, the coupling features 430 form an angle of at least 90° (e.g., approximately 180°, as shown in the accompanying figures). The coupling features 430 receive (slidably couple to) the complementary coupling features 225 of the repositionable junction box 210 when the repositionable junction box 210 is mechanically coupled to the frame 410. The coupling features 430 can prevent the coupling features 225 (and, thus, the rest of the repositionable junction box 210) from moving further downward toward and/or rotating from a vertical position with respect to the frame 410. The coupling features 430 can include one or more features (e.g., apertures, (as shown in FIG. 2D), detents, a stepped configuration) to directly or indirectly couple the repositionable junction box 210 to the frame 430.

In certain example embodiments, since each (or at least more than one) of the sides of the frame 410 is similarly arranged with respect to the coupling features 290 and the coupling features 430, the repositionable junction box 210 can be moved by a user, changing positions and/or orientations relative to the frame 410. The repositionable junction box 210 can be moved with or without the use of tools (e.g., wrench, screwdriver). FIGS. 3A-3D show various views of various positions of the example repositionable junction box of FIG. 2 in accordance with certain example embodiments. FIGS. 3C and 3D show the luminaire 301 where the relative position of the repositionable junction box 210 is rotated counter-clockwise by 90° relative to the position of the repositionable junction box 210 for the luminaire 300 of FIGS. 3A and 3B.

Figure 3A:
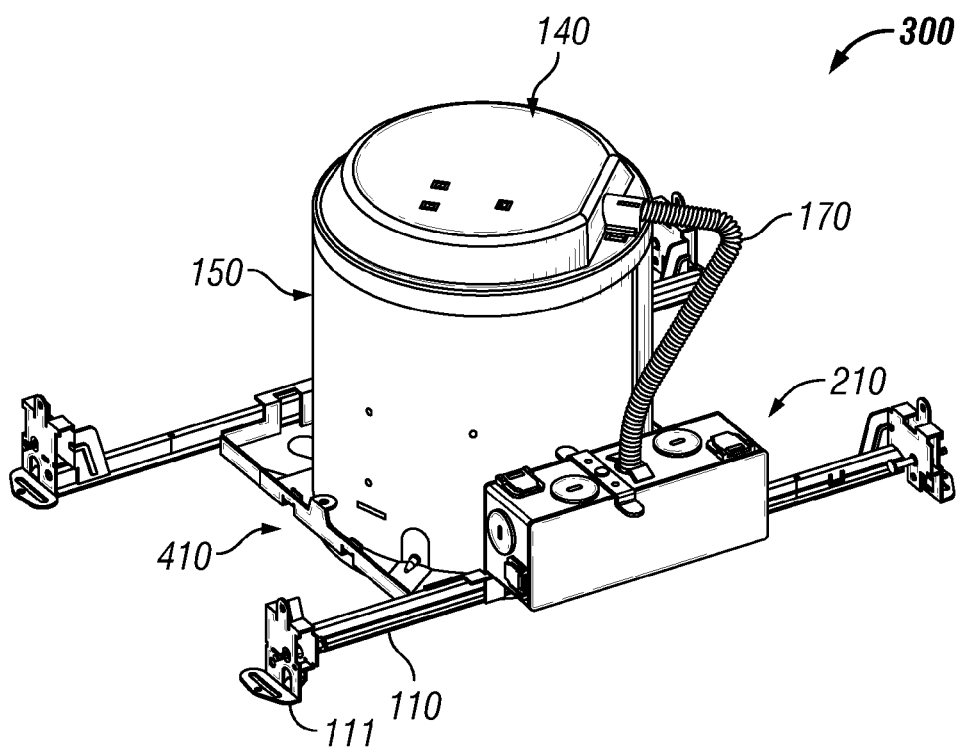
FIGS. 3A-3D show various views of various positions of the example repositionable junction box of FIG. 2 in accordance with certain example embodiments.
Figure 3B:
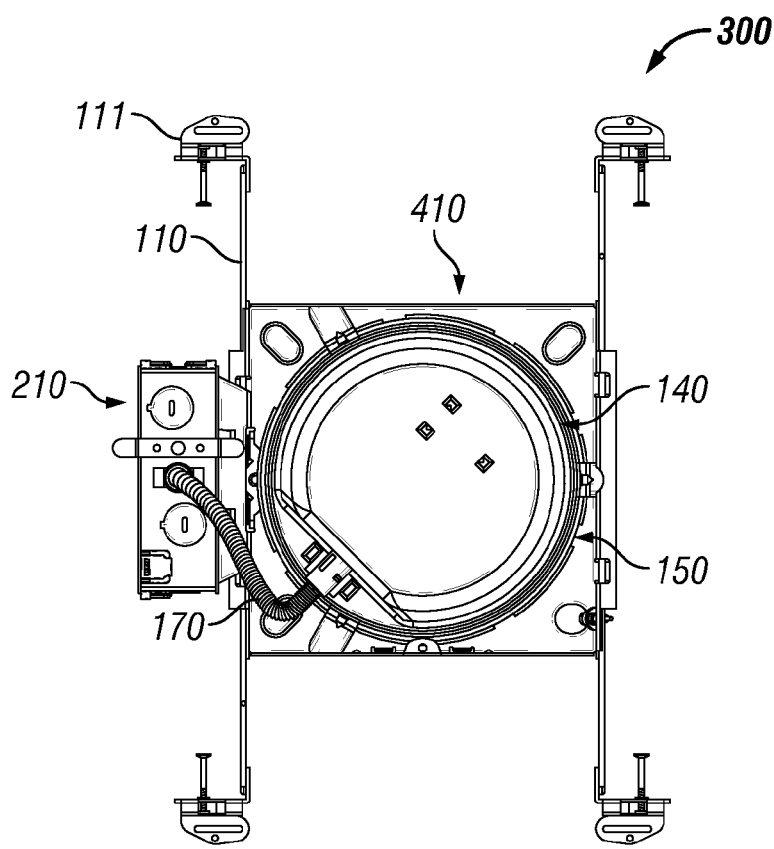
Figure 3C:
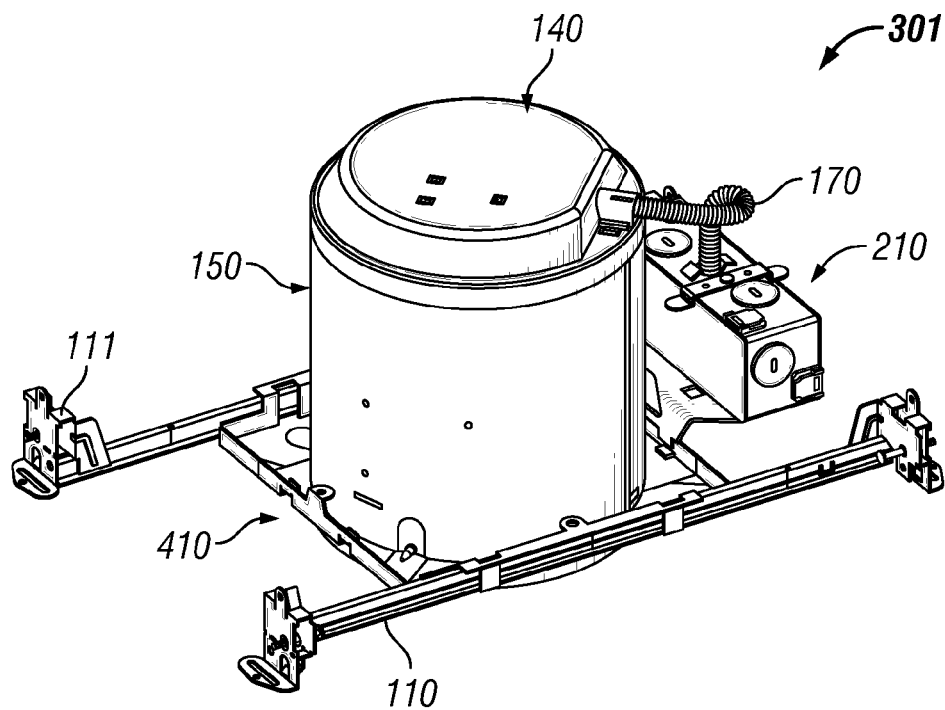
Figure 3D:
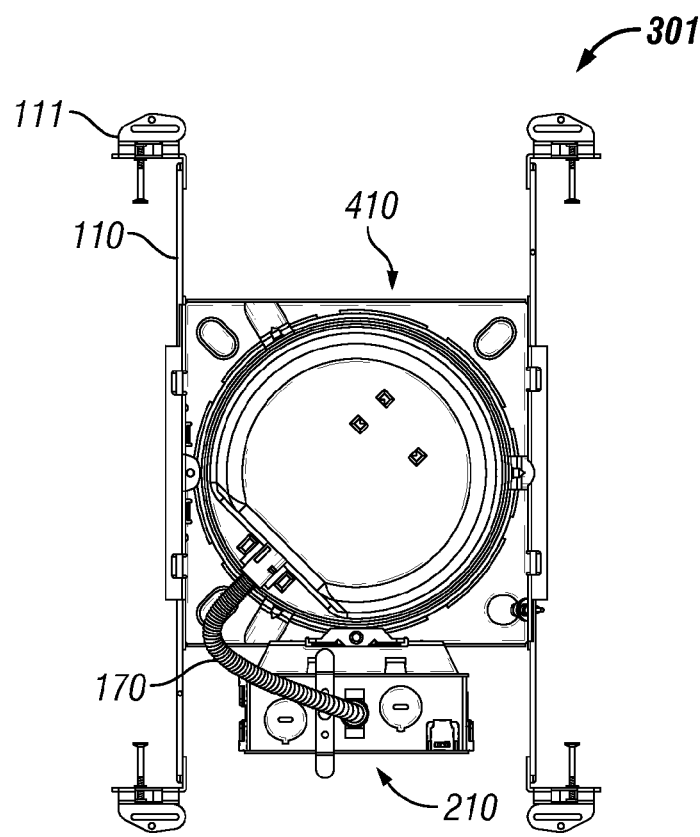

Specifically, to move the repositionable junction box 210 in this example, the repositionable junction box 210 can be decoupled from the relative position shown in FIGS. 3A and 3B by removing the fastening device 240 and sliding the coupling features 225 away from the coupling features 430. Once done, the repositionable junction box 210 can be coupled to an adjacent edge of the frame 410 in the manner described above. In addition, or in the alternative, the relative position of the repositionable junction box 210 can be rotated by some angle other than 90°. For example, the relative position of the repositionable junction box 210 can be rotated by 180°. A flexible conduit 170 is coupled to both the repositionable junction box 210 and the housing top 140, which is disposed on the top end of the housing 150.

In certain example embodiments, the frame 410 can have the complementary coupling features (e.g., coupling feature 430, coupling feature 290) for mechanically coupling the repositionable junction box 210 to the frame 410 positioned at any one or more portions (e.g., center) along an edge of the frame 410. In addition, or in the alternative, adjacent edges of the frame 410 (or some other component of the luminaire) can have features that allow the repositionable junction box 210 to be oriented at some angle that is antiparallel to every side of the frame 410.

FIG. 4 shows an exploded view of the example repositionable junction box 210 of FIG. 2 in accordance with certain example embodiments. In one or more embodiments, one or more of the components shown in FIG. 4 may be omitted, added, repeated, and/or substituted. Accordingly, embodiments of a junction box should not be considered limited to the specific arrangements of components shown in FIG. 4.

In addition to showing the coupling features 217 of the coupling portion 220 decoupled from the coupling features 328 of the cover 320, one or more of the walls of the base 209 can include one or more slots 417. Each slot 417 can receive a wire trap 202. The wire trap 202 can be coupled (e.g., fixedly, slidably, removably) to a slot 417 in the base 209 in any suitable manner. Each wire trap 202 can be used to pass one or more wires therethrough, where a wire can be a single conductor or a cable having multiple conductors. In certain example embodiments, a portion (e.g., cover 310, cover 320) of the repositionable junction box 210 can be used to secure one or more wire traps 202 in a slot 417. For example, as shown in FIG. 6A below, when the fastening mechanism 250 is mechanically coupled to the cover 310 and the cover 320, all of the wire traps 202 can be secured within their respective slots 417.

Figures 5A, 5B:
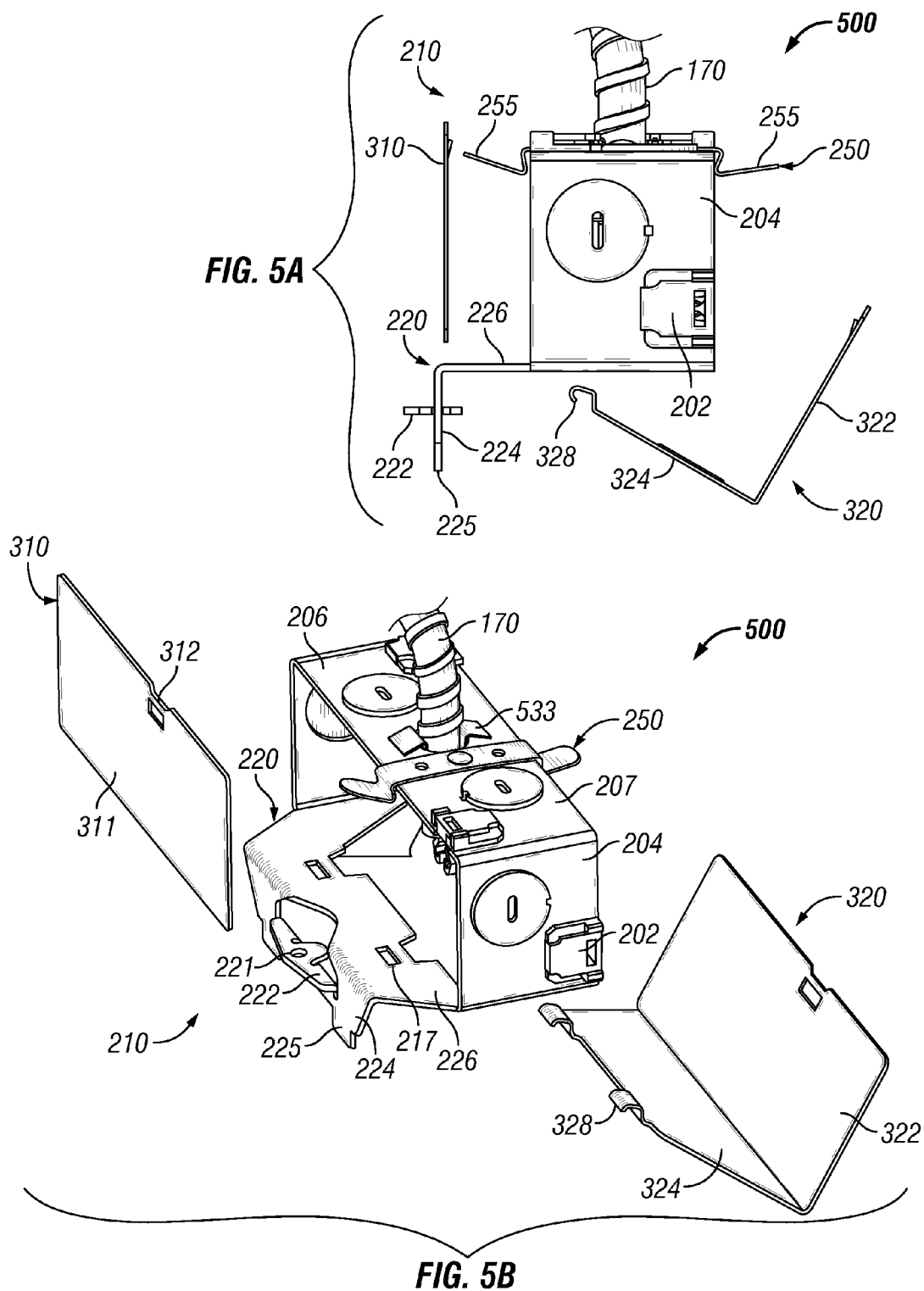
FIGS. 5A and 5B show various views of a portion of the luminaire that includes the example junction box of FIG. 4 in accordance with certain example embodiments.

FIGS. 5A and 5B show various views of a portion 500 of a luminaire that includes the example repositionable junction box 210 of FIG. 4 in accordance with certain example embodiments. Specifically, FIG. 5A shows a partially exploded side view of the repositionable junction box 210, and FIG. 5B shows a partially exploded perspective view of the repositionable junction box 210. Referring to FIGS. 1-5B, in both cases, the flexible conduit 170 is mechanically coupled to a portion (e.g., wall 206) of the base 209. In such a case, a connector 533 can be used to couple an end of the flexible conduit 170 to the base 209 of the repositionable junction box 210.

Figure 6A:
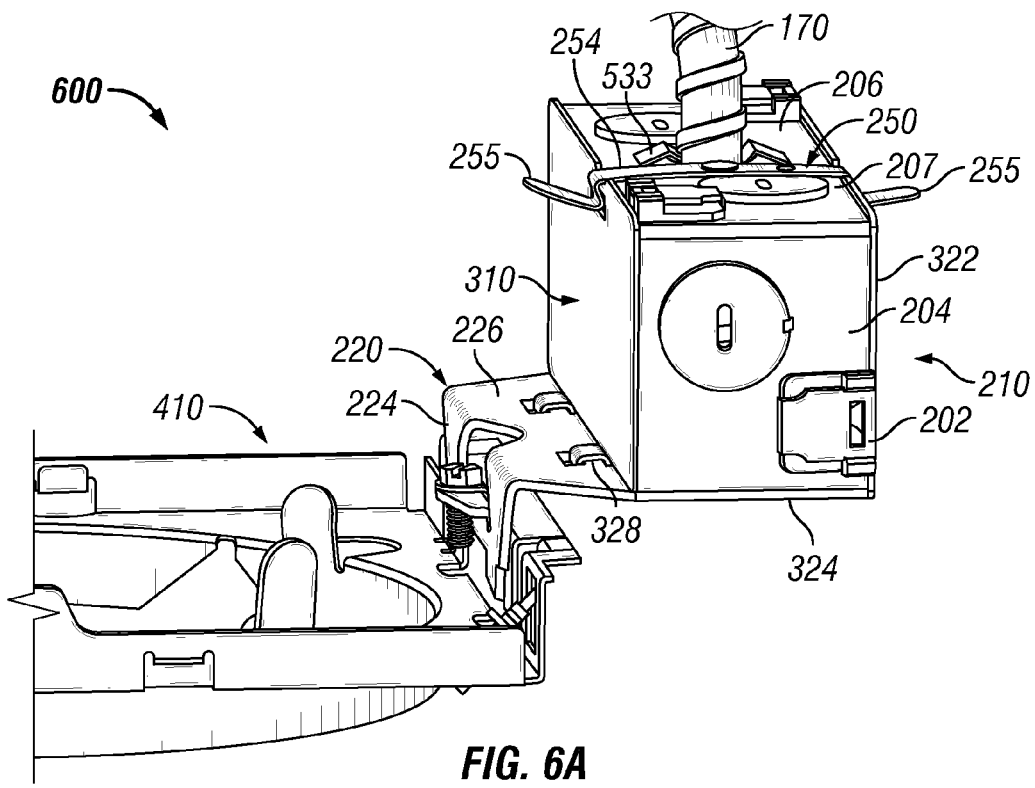
FIGS. 6A and 6B show various views of a portion of a luminaire that includes the example junction box of FIG. 2 in accordance with certain example embodiments.
Figure 6B:
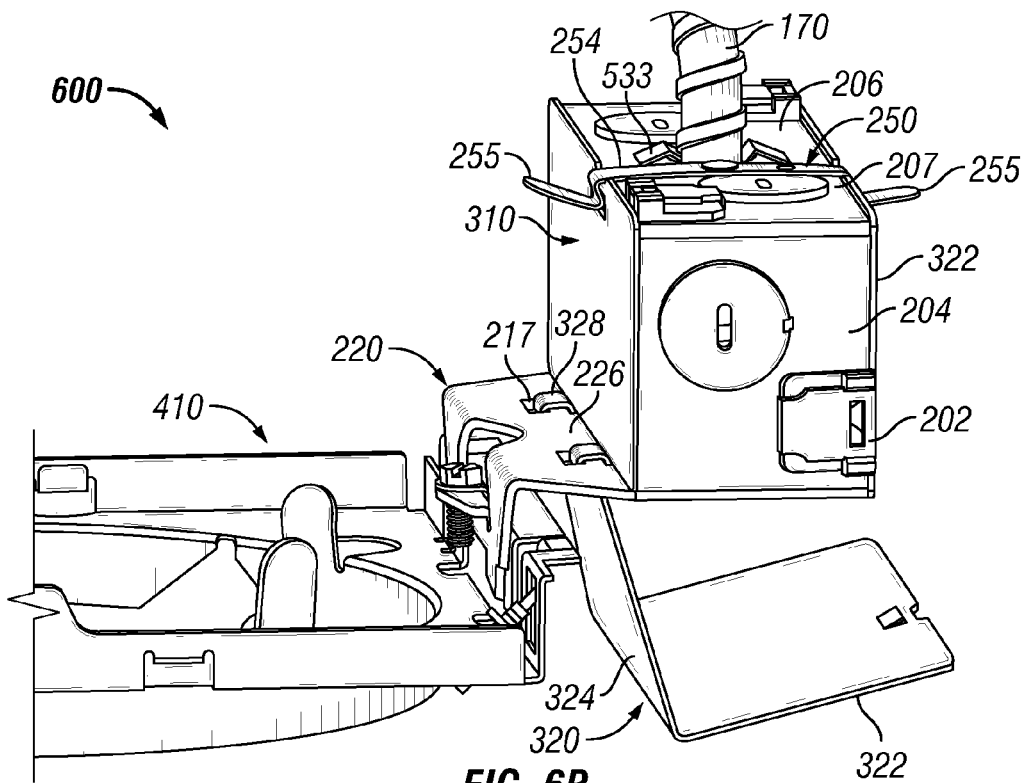

FIGS. 6A and 6B show various views of a portion 600 of a luminaire that includes the example repositionable junction box 210 of FIG. 4 in accordance with certain example embodiments. Specifically, FIG. 6A shows a side perspective view of the portion of the luminaire 600 that includes the example repositionable junction box 210 with the cover 320 in the closed position. FIG. 6B shows a side perspective view of the portion of the luminaire 600 that includes the example repositionable junction box 210 with the cover 320 in the open position.

Referring to FIGS. 1-6B, in both cases, the flexible conduit 170 is mechanically coupled to a portion (e.g., wall 206) of the base 209 using the connector 533. In addition, the repositionable junction box 210 is mechanically coupled to a portion of the frame 410, as described above with respect to FIGS. 2A-3B. As shown in FIG. 6B, the cover 310, positioned between the coupling features 217 and the walls of the base 209 when the cover is in the closed position, prevents the coupling features 328 of the cover 320 from becoming decoupled with the coupling features 217.

In addition, FIG. 6B shows that the shape and size of the cover 320 relative to the shape and size of the coupling feature 220 and the shape and size of the frame 410 can allow the cover 320 to rotate so that the side wall 322 becomes substantially parallel with the bottom 226 of the base 209 of the repositionable junction box 210, giving total access to the cavity 219 of the repositionable junction box 210. In such a case, if the cover 310 is in the open position (which means that the cover 310 is removed), then the coupling features 328 of the cover 320 can be coupled to and/or decoupled from the coupling features 217.

Figure 7:
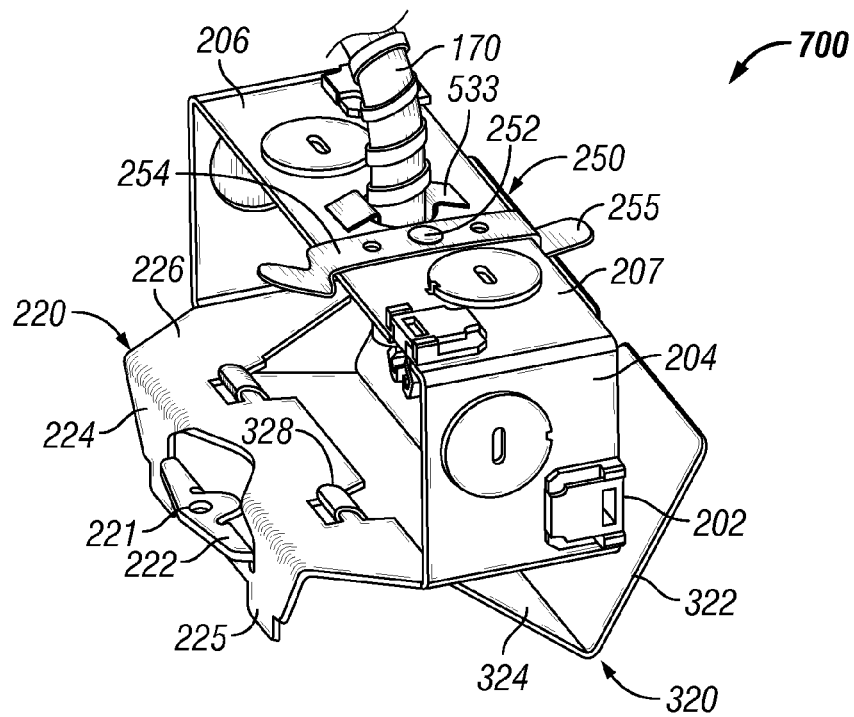
FIG. 7 shows a side perspective view of a portion of the luminaire of FIGS. 5A and 5B with the flat cover removed in accordance with certain example embodiments.

FIG. 7 shows a side perspective view of a portion 700 of the luminaire of FIGS. 5A and 5B with the cover 310 removed in accordance with certain example embodiments. In other words, FIG. 7 shows how the cover 320 can be removed (decoupled) from the base 209. Specifically, because the cover 310 is removed and so is not in a position to retain the coupling features 328 within the coupling features 217, the coupling features 328 can decouple from the coupling features 217 when the cover 320 rotates approximately to the point where the side wall 322 of the cover 320 is substantially parallel with the bottom 226 of the base 209.

Figure 8:
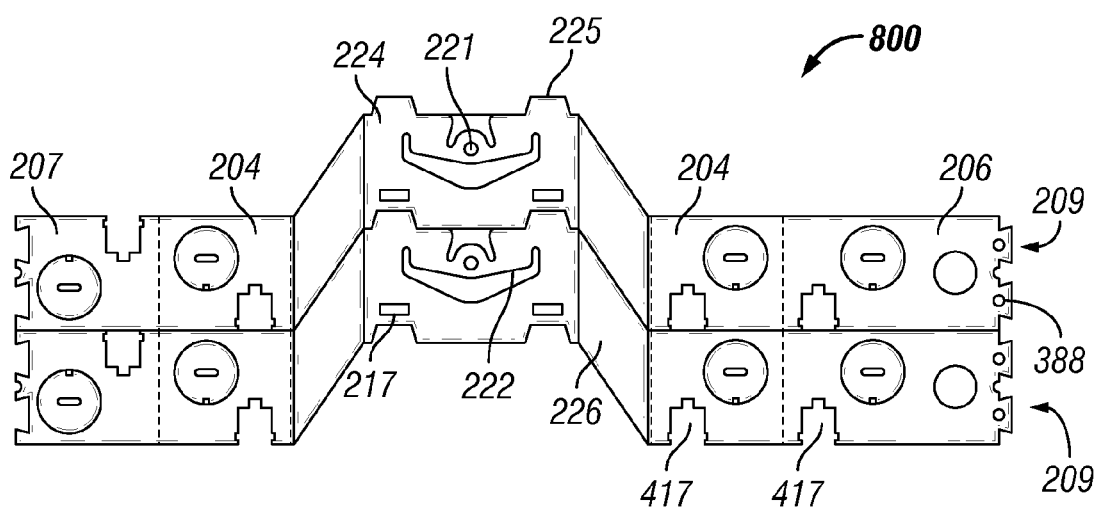
FIG. 8 shows a flat view of two example bodies of junction boxes in accordance with certain example embodiments.

FIG. 8 shows a flat view of an assembly 800 of two example bodies 209 of repositionable junction boxes in accordance with certain example embodiments. As explained above, certain example components can be manufactured using a reduced amount of material. The assembly 800 of FIG. 8 shows such an example component. Here, the bodies 209 are created by cutting, pressing, stamping, bending, and otherwise manipulating a continuous sheet of some material (e.g., metal, plastic, rubber). The various portions of the base 209 are labeled in a manner consistent with, for example, FIG. 4 above.

Certain example embodiments provide a number of benefits. Examples of such benefits include, but are not limited to, use of fewer materials, simplified installation, simplified inspection, simplified maintenance, installation of a luminaire in relatively small spaces, and reduced cost. Example repositionable junction boxes described herein also allow for increased flexibility by repositioning the junction box without having to change and/or move any other components of a luminaire.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A junction box, comprising:
   a base comprising at least one wall that forms a cavity, wherein the base has a first open end and a second open end, wherein the first open end is opposite the second end;
   a first cover removably coupled to the base, wherein the first cover covers the first open end of the base when the first cover is coupled to the base; and
   a second cover removably coupled to base, wherein the second cover covers the second open end of the base when the second cover is coupled to the base,
   wherein the first cover prevents the second cover from decoupling from the base when the first cover is coupled to the base.

2. The junction box of claim 1, further comprising:
   a fastening mechanism coupled to the base, wherein the fastening mechanism is removably coupled to the first cover and the second cover,
   wherein the fastening mechanism, when coupled to the first cover, abuts the first cover against the base, and
   wherein the fastening mechanism, when coupled to the second cover, abuts the second cover against the base.

3. The junction box of claim 1, wherein the second cover is hingedly coupled to the base when the fastening mechanism is decoupled from the second cover and when the fastening mechanism is coupled to the first cover.

4. The junction box of claim 3, wherein the cavity is accessible when the fastening mechanism is decoupled from the second cover and the second cover is hingedly rotated away from the second open end of the base.

5. The junction box of claim 1, wherein the first cover is removable from the base when the fastening mechanism is decoupled from the first cover.

6. The junction box of claim 5, wherein the cavity is accessible when the fastening mechanism is decoupled from the first cover.

7. The junction box of claim 5, wherein the second cover is removable from the base when the first cover is decoupled from the base.

8. The junction box of claim 1, wherein the base further comprises at least one frame coupling feature, wherein the at least one frame coupling feature is configured to be removably coupled to a frame.

9. The junction box of claim 8, wherein the base is stamped from a single piece of material, wherein the at least one wall of the base is stamped in a planar sheet comprising a first end and a second end, wherein the at least one wall is folded in four locations, wherein the four locations are folded substantially perpendicularly, and wherein the first end of the base interlocks with the second end of the base to form the cavity.

10. The junction box of claim 1, wherein the at least one wall of the base comprises at least one coupling feature that hingedly couples to at least one coupling feature of the second cover.

11. The junction box of claim 1, wherein the bottom further has a partially open bottom end, wherein the partially open bottom end is adjacent to the first open and the second open end, and wherein the second cover further covers partially open bottom end.

12. A luminaire, comprising:
    a junction box comprising a base, wherein the base comprises a distal extension, wherein the distal extension comprises at least one first frame coupling feature and at least one second frame coupling feature; and
    a frame removably coupled to the junction box, wherein the frame comprises at least one first junction box coupling feature and at least one second junction box coupling feature, wherein the at least one first junction box coupling feature couples to the at least one first frame coupling feature of the junction box, and wherein the at least one second junction box coupling feature couples to the at least one second frame coupling feature of the junction box.

13. The luminaire of claim 12, wherein the at least one first junction box coupling feature comprises a receiving tab, wherein the at least one second junction box coupling feature comprises a mating shelf, wherein the at least one first frame coupling feature comprises a tab, wherein the at least one second frame coupling feature comprises a coupling platform, wherein the tab is disposed within the receiving tab and the coupling platform abuts against the mating shelf when the junction box is coupled to the frame.

14. The luminaire of claim 13, further comprising:
    at least one fastening device, wherein the fastening device is disposed within a first aperture that traverses the coupling platform and within a second aperture that traverses the mating shelf.

15. The luminaire of claim 12, wherein the frame comprises a plurality of at least one first junction box coupling features and a plurality of at least one second junction box coupling features located at different positions along the frame.

16. A junction box, comprising:
    a base comprising at least one wall that forms a cavity, wherein the at least one wall comprises a bottom side, wherein the bottom side has a first shape that forms a tapered opening;
    a cover hingedly coupled to the bottom side of the base, wherein the cover comprises an end having a second shape that complements the first shape, wherein the end of the cover abuts against the bottom side of the base and covers the tapered opening formed by the first shape when the cover is coupled to the base.

17. The junction box of claim 16, wherein the second shape is substantially a trapezoid.

18. The junction box of claim 16, wherein the cover comprises at least one base coupling feature that hingedly couples to at least one cover coupling feature disposed in the side of the base.

19. The junction box of claim 18, wherein the at least one cover coupling feature comprise a slot, and wherein the at least one base coupling feature comprises a tab having a hooked end, wherein the tab is disposed at an end of the cover.

20. A luminaire, comprising:
    a junction box comprising a base, wherein the base comprises a distal extension, wherein the distal extension comprises a coupling platform, wherein the coupling platform comprises at least one first aperture that traverses therethrough;

a frame removably coupled to the junction box, wherein the frame comprises a mating shelf, wherein the mating shelf comprises at least one second aperture that traverses therethrough; and
at least one fastening device disposed in the at least one first aperture and the at least one second aperture,
wherein the coupling platform abuts against the mating shelf when the junction box is coupled to the frame.

* * * * *